United States Patent
Lee et al.

(10) Patent No.: US 10,003,289 B2
(45) Date of Patent: Jun. 19, 2018

(54) METHOD FOR CONTROLLING MOTOR

(71) Applicant: Hyundai Motor Company, Seoul (KR)

(72) Inventors: Dong Hun Lee, Gyeonggi-do (KR);
Chang Seok Ryu, Gyeonggi-do (KR);
Min Su Kang, Gyeonggi-Do (KR);
Sung Do Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 67 days.

(21) Appl. No.: 15/053,516

(22) Filed: Feb. 25, 2016

(65) Prior Publication Data

US 2017/0063263 A1   Mar. 2, 2017

(30) Foreign Application Priority Data

Aug. 28, 2015   (KR) .................. 10-2015-0121394

(51) Int. Cl.
*H02P 6/17*   (2016.01)
*H02P 21/18*   (2016.01)
*H02P 21/22*   (2016.01)
*H02P 23/14*   (2006.01)

(52) U.S. Cl.
CPC ................ *H02P 6/17* (2016.02); *H02P 21/18* (2016.02); *H02P 21/22* (2016.02); *H02P 23/14* (2013.01)

(58) Field of Classification Search
CPC ............. H02P 6/17; H02P 21/18; H02P 21/22
USPC ............... 318/400.02, 400.01, 700
See application file for complete search history.

(56) References Cited

U.S. PATENT DOCUMENTS

| 5,663,616 A * | 9/1997 | Stringfellow ............. H02P 6/16 318/400.04 |
| 5,903,129 A * | 5/1999 | Okuno .................... H02P 21/18 318/721 |
| 6,566,837 B1 * | 5/2003 | Zhang .................... G05B 19/19 318/610 |
| 6,694,828 B1 * | 2/2004 | Nicot ...................... B62D 1/16 180/422 |
| 8,104,584 B2 * | 1/2012 | Piedra ..................... B66B 1/30 187/290 |
| 2003/0034006 A1 * | 2/2003 | Richard ................ F02D 31/001 123/352 |
| 2006/0042074 A1 * | 3/2006 | Stork ........................ F01L 1/34 29/622 |
| 2006/0175994 A1 * | 8/2006 | Fulks ..................... B60T 7/085 318/400.01 |

(Continued)

FOREIGN PATENT DOCUMENTS

JP   H10282132   10/1998
JP   2008-022649   1/2008

(Continued)

*Primary Examiner* — Kawing Chan
(74) *Attorney, Agent, or Firm* — Mintz Levin Cohen Ferris Glovsky and Popeo, P.C.; Peter F. Corless

(57) ABSTRACT

A method for controlling a motor is provided. The motor control method includes deriving a motor rotational speed estimate using a speed estimator model and deriving a motor hall sensor frequency estimate based on the derived rotational speed estimate. Additionally, a filter for noise detection is set based on the derived hall sensor frequency estimate and the derived rotational speed estimate. A motor hall sensor frequency derived from the hall sensor is then applied to a predetermined filter to detect a hall sensor noise frequency.

9 Claims, 2 Drawing Sheets

(56) References Cited

U.S. PATENT DOCUMENTS

| | | | | |
|---|---|---|---|---|
| 2009/0267546 | A1* | 10/2009 | Maekawa | H02P 21/14 318/400.02 |
| 2011/0084638 | A1* | 4/2011 | Patel | B60K 1/02 318/400.32 |
| 2011/0254498 | A1* | 10/2011 | Yang | H02P 6/085 318/721 |
| 2013/0209074 | A1* | 8/2013 | Lebrun | H02P 6/06 388/809 |
| 2014/0215725 | A1* | 8/2014 | Paglia | D06F 35/007 8/137 |
| 2015/0277322 | A1* | 10/2015 | Doshida | G03G 15/5008 399/167 |

FOREIGN PATENT DOCUMENTS

| | | |
|---|---|---|
| JP | 2010-011564 A | 1/2010 |
| JP | 2013-221917 A | 10/2013 |
| KR | 2000-0074672 | 12/2000 |
| KR | 20140073667 | 6/2014 |

\* cited by examiner

METHOD FOR CONTROLLING MOTOR

CROSS-REFERENCE TO RELATED APPLICATION

This application claims the priority benefit of Korean Patent Application No. 10-2015-0121394, filed on Aug. 28, 2015 in the Korean Intellectual Property Office, the disclosure of which is incorporated herein by reference.

BACKGROUND

1. Field of the Invention

The present invention relates to a method for controlling a motor, which is capable of effectively removing noise generated at a hall sensor that measures a position of a rotor in the motor.

2. Description of the Related Art

Generally, for control of a 3-phase brushless motor for motor-driven power steering, it is necessary to accurately calculate position of a rotor in a motor. A stator in such a motor utilizes a magnetic field generated when current flows through a 3-phase coil. On the other hand, the rotor of the motor uses permanent magnets arranged to alternate N and S poles. For continuous rotation of the motor, a continuous rotating magnetic field should be generated in the motor. For generation of such a continuous rotating magnetic field, it is necessary to commutate current flowing through a coil of each phase in an armature at an appropriate point in time. For appropriate commutation, position of the rotor should be accurately recognized. Here, "commutation" refers to reversing the direction of current flowing through the stator coil of the motor, for rotation of the rotor.

For smooth operation of such a motor, position of the rotor should coincide with the point of time when phase current is reversed in direction. Accordingly, a device for detecting position of the rotor is required. Generally, detection of position of the rotor may be achieved using a hall sensor configured to generate a potential difference varying based on a variation in magnetic flux. In another case, a current transformer (CT) is installed for each phase of the stator.

However, even when the above-mentioned hall sensor or CT is used, noise is generated due to friction between elements of the motor. Due to such noise, motor control accuracy may be degraded. Accordingly, various control methods and apparatuses have been proposed. For example, an apparatus capable of achieving an improvement in reliability of basic information for derivation of rotational speed and rotation amount of a motor through removal of noise has been disclosed. However, when a noise signal momentarily enters a Hall sensor configured to transmit and receive only a digital signal, in the above-mentioned conventional case, the Hall sensor may not determine whether the received signal is a noise signal or a normal signal and, as such, speed and position calculation may be erroneously carried out. As a result, speed instability may occur, or motor current control may be erroneously carried out, and, as such, overcurrent may be generated.

The above matters disclosed in this section are merely for enhancement of understanding of the general background of the invention and should not be taken as an acknowledgement or any form of suggestion that the matters form the related art already known to a person skilled in the art.

SUMMARY

Therefore, the present invention provides a method for controlling a motor, which is capable of effectively removing noise generated at a hall sensor included in the motor, using a speed estimator model and a band-pass filter, thereby achieving an enhancement in efficiency of motor control.

In accordance with the present invention, a method for controlling a motor may include speed estimate derivation of deriving a motor rotational speed estimate by a controller using a speed estimator model, frequency estimate derivation of deriving a motor hall sensor frequency estimate by the controller, based on the derived rotational speed estimate, filter setting of setting a filter for noise detection by the controller, based on the derived hall sensor frequency estimate and the derived rotational speed estimate, and noise detection of applying a motor hall sensor frequency derived from a hall sensor provided at the motor to a predetermined filter, thereby detecting a hall sensor noise frequency by the controller.

The speed estimate derivation may include deriving the motor rotational speed estimate using a q-axis voltage equation as to a motor rotating magnetic field. The q-axis voltage equation may satisfy the following Expression:

$$V_q = R_s \times I_q - L_q \times (dI_q/dt) + \omega_e \times L_d \times I_d + \omega_e \times \Psi_f$$

wherein, $V_q$ is a q-axis voltage of a rotating magnetic field, $R_s$ is an armature coil resistance, $I_q$ is a q-axis current of the rotating magnetic field, $L_q$ is a q-axis inductance of the rotating magnetic field, $\omega_e$ is the motor rotational speed estimate, $I_d$ is a d-axis current of the rotating magnetic field, and $\Psi_f$ is an armature magnetic flux linkage generated by permanent magnets.

The speed estimate derivation may include deriving the motor rotational speed estimate using an equation as to relation between torque and load in the motor. The equation as to relation between torque and load in the motor may satisfy the following Expression:

$$T_q = J \times \theta'' + B \times \omega_e + K \times \omega_e^2$$

wherein, $T_q$ is a rotational torque of the motor, J is a rotational inertial momentum of the motor, $\theta''$ is a rotational acceleration of the motor, B is a rotational frictional coefficient of the motor, $\omega_e$ is the motor rotational speed estimate, and K is a line resistance coefficient.

The frequency estimate derivation may include deriving the motor hall sensor frequency estimate using the following Expression:

$$f = \omega_e / 2\pi$$

wherein, f is the Hall sensor frequency estimate, and $\omega_e$ is the motor rotational speed estimate.

The filter setting may include setting a band-pass filter that allows the frequency estimate derived in the frequency estimate derivation to pass therethrough. The band-pass filter may have a bandwidth derived by multiplying a motor rotational speed estimate variation by a safety factor. The band-pass filter may have a bandwidth derived using the following Expression:

$$B = \alpha \times \Delta \omega_e / \pi$$

wherein, B is a bandwidth, $\alpha$ is a safety factor, and $\Delta \omega_e$ is a motor rotational speed estimate variation.

The band-pass filter may have a bandwidth derived by use of map data to provide the bandwidth as an output based on the motor rotational speed estimate as an input.

The method may further include frequency comparison of, after the filter setting, comparing, by the controller, the motor hall sensor frequency derived by the hall sensor disposed at the motor with a bandwidth of the filter set in the filter setting, to determine whether the derived motor hall sensor frequency is included in the bandwidth, noise detection of detecting, by the controller, the motor hall sensor frequency as noise when the derived motor hall sensor frequency is not included in the bandwidth, and motor control of deriving, by the controller, a position of the rotor in the motor and a speed of the rotor while excluding the hall sensor frequency detected as noise, and operating the motor by the controller, based on the derived position and speed.

The method may further include motor control of, after the frequency comparison, deriving, by the controller, a position of the rotor and a speed of the rotor using the motor hall sensor frequency derived by the hall sensor disposed at the motor when the derived motor hall sensor frequency is included in the bandwidth of the filter, and operating the motor by the controller, based on the derived position and speed.

In accordance with the present invention, the following effects are provided.

First, noise of a hall sensor signal may be effectively removed in all driving speed ranges and, as such, motor control stability may be enhanced.

Second, reliability of hall sensor noise signals may be enhanced and, as such, errors of motor speed measurement based on hall sensor signals are reduced. As a result, instability of motor rotational speed control may be reduced.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
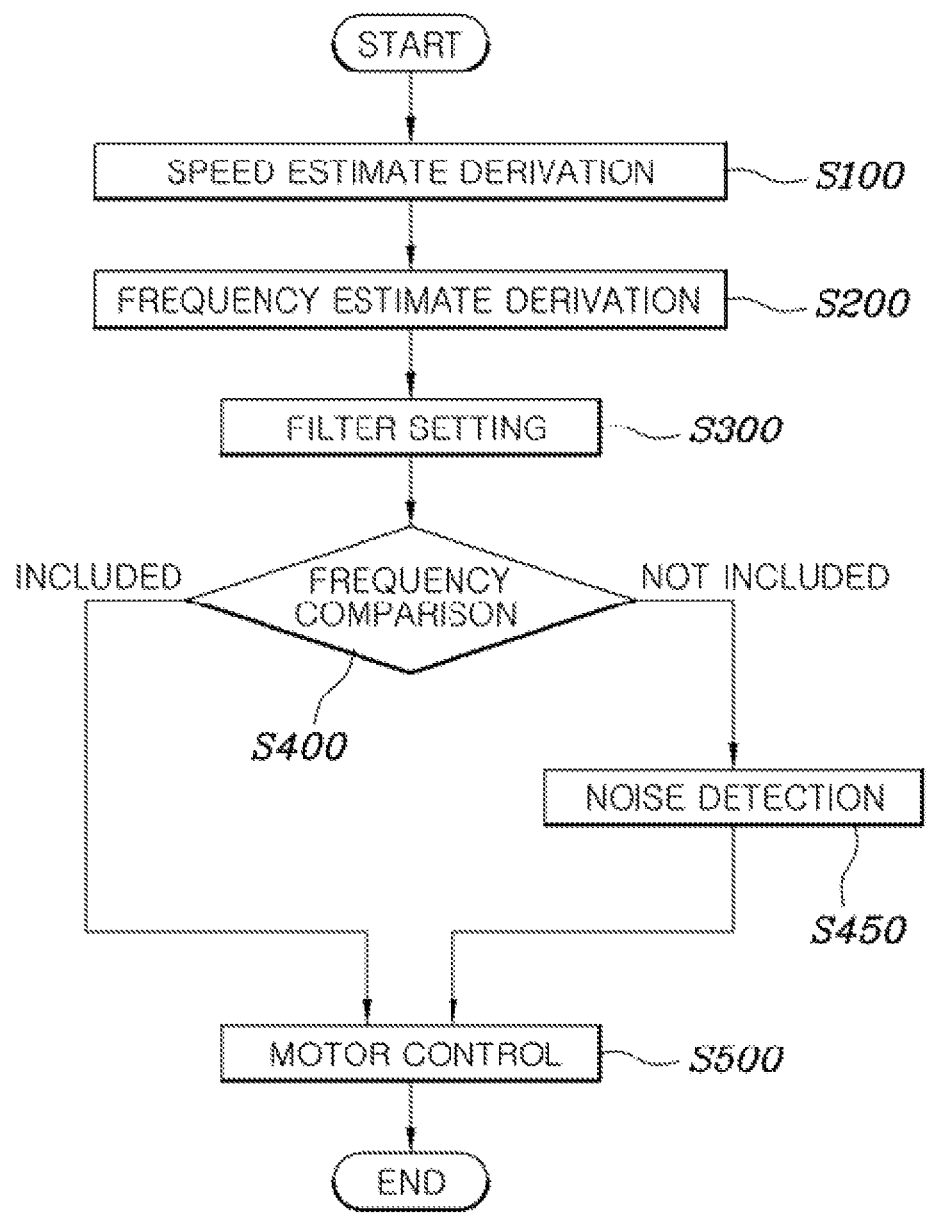
FIG. 1 is a flowchart illustrating a method for controlling a motor in accordance with an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. Wherever possible, the same reference numbers will be used throughout the drawings to refer to the same or like parts.

Generally, in a motor, it may be difficult to determine noise due to a signal received from a hall sensor disposed at the motor being a digital signal of "0" or "1". Furthermore, when the motor is started from a stopped state, it may be difficult to filter out noise from a sensing signal from the hall sensor since information has not been provided regarding a previous speed value. When the motor is started from a stopped state in which no current is applied to a 3-phase coil of the motor, current may be applied to the 3-phase coil as a 3-phase switching element is abruptly switched on. As a result, noise may be abruptly increased and, thus, a substantial amount of noise is included in a sensing signal from the hall sensor.

When the rotational speed of the motor increases to a maximum, the frequency of the hall sensor signal is also increased and, as such, it may be difficult to determine noise based only on the frequency. Accordingly, the present invention proposes a technology for effectively removing noise from a hall sensor signal by estimating a rotational speed of a motor using a model for estimating the rotational speed of the motor, and estimating a frequency of a normal hall sensor signal, based on the rotational speed estimate while designing a band-pass filter (BPF) for allowing, based on the frequency estimate, only the frequency components of the hall sensor signal having frequencies near the frequency estimate to pass therethrough.

Referring to FIG. 1, a motor control method according to an exemplary embodiment of the present invention is illustrated. As illustrated in FIG. 1, the motor control method may include deriving a motor rotational speed estimate using a speed estimator model (S100), deriving a motor hall sensor frequency estimate, based on the derived rotational speed estimate (S200), and setting a filter for noise detection, based on the derived hall sensor frequency estimate and the derived rotational speed estimate (S300). The speed estimate derivation S100, frequency estimate derivation S200, and filter setting S300 may be executed by a controller in this order.

The speed estimate derivation S100 is a first procedure in removing noise generated at a hall sensor included in the motor, as described above. Additionally, the estimation of a rotational speed of the motor may be achieved using various methods. However, the present invention proposes a method for estimating a rotational speed of the motor using the speed estimator model.

A first method of rotational speed estimate derivation is a method for deriving a rotational speed estimate of the motor using an equation as to a q-axis voltage of a rotating magnetic field generated in the motor. Generally, the waveform of current generated based on the rotation of the motor may be derived by the q-axis equation after inputting reactance of the motor and a magnetic flux generated by permanent magnets in the motor. Similarly, the present invention proposes a method for estimating a rotational speed of the motor using the q-axis equation.

A voltage equation, which is an equation as to a magnetic flux linkage generated based on rotation of permanent magnets, may be mainly divided into a q-axis voltage equation and a d-axis voltage equation. The q-axis voltage equation may be expressed by the following Expression:

$$V_q = R_s \times I_q - L_q \times (dI_q/dt) + \omega_e \times L_d \times I_d + \omega_e \times \Psi_f$$

wherein, $V_q$ is q-axis voltage of a rotating magnetic field, $R_s$ is armature coil resistance, $I_q$ is q-axis current of the rotating magnetic field, $L_q$ is q-axis inductance of the rotating magnetic field, $\omega_e$ is a motor rotational speed estimate, $I_d$ is d-axis current of the rotating magnetic field, and $\Psi_f$ is a magnetic flux linkage of the armature generated by the permanent magnets.

The d-axis inductance $L_d$ and q-axis inductance $L_q$, armature coil resistance Rs, and armature magnetic flux linkage $\Psi_f$ generated by the permanent magnets are motor design parameter values, and may be considered constants even though they are varied based on temperature and operation states. As these values, design values or values measured after fabrication of the motor may be used. The differential term of the q-axis current to time may be omitted or disregarded when the q-axis inductance is minimal, or the differential value of the q-axis current to time is sufficiently minimal, compared to other values.

In addition, in a surface permanent magnet synchronous motor (SPMSM), d-axis current may be disregarded since current is applied only to the q-axis of a rotating coordinate system without being applied to the d-axis of the rotating coordinate system during operation at a maximum efficiency and, as such, d-axis current becomes "0" ($I_d=0$). The q-axis voltage of the rotating coordinate system may be estimated based on a pulse width modulation (PWM) switching duties applied to three phases. Further, the q-axis current of the rotating coordinate system may be calculated based on a current value sensed by a current sensor mounted to a 3-phase inverter output. Alternatively, as the q-axis current of the rotating coordinate system, an output value from a speed controller, namely, a q-axis current command value, may be used as it is. In particular, various types of controllers may be used for the speed controller, such as, a proportional integral (PI) controller or a proportional integral derivative (PID) controller When the above-described first method is supposed as a motor rotational speed estimation derivation method using a q-axis voltage equation, a second method of rotational speed estimate derivation is a method for deriving a motor rotational speed estimate using an equation based on a relationship between torque and load in the motor. Generally, when a motor is mounted to a power receiver system or a power supplier system, a rotational speed of the motor may be derived using the following torque equation:

$$T_q = J \times \theta'' + B \times \omega_e + K \times \omega_e^2$$

wherein, $T_q$ is rotational torque of the motor, J is a rotational inertial momentum of the motor, $\theta''$ is a rotational acceleration of the motor, B is a rotational frictional coefficient of the motor, $\omega_e$ is a rotational speed estimate of the motor, and K is a line resistance coefficient.

Generally, torque generated in the motor is equal to the sum of an acceleration force in a rotating system, a frictional force in the rotating system, and a load generated due to a flow rate and a pressure in the rotating system. Accordingly, when a motor system and a power receiver model, which are illustrated in FIG. 2, are used based on the above-described conditions, it may be possible to more easily derive a rotational speed estimate of a motor, based on a q-axis current command value applied to the motor.

Figure 2:
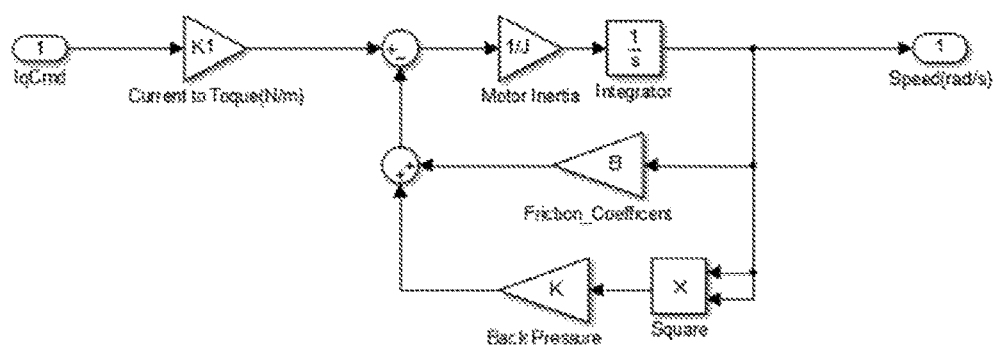
FIG. 2 is a circuit diagram illustrating a motor system and a power receiver model according to an exemplary embodiment of the present invention.

In FIG. 2, "IqCmd" indicates a q-axis current command value. The current command value is generated based on a rotational speed obtained based on driving of the motor. When the motor is driven to obtain a target output desired by the user, a rotational speed command value for the motor may be converted into a current command value using a speed controller. Particularly, "rotational speed command value" refers to a rotational speed value of the motor arbitrarily set by the user to obtain a desired motor output. Accordingly, the rotational speed command value may be varied based on a user request or intent and the type and state of the motor. As a result, the current command value may be varied. "K1" refers to a conversion constant for conversion of a current command value into a torque value, "B" refers to a rotational frictional coefficient of the motor, as described above, and "K" refers to a line resistance coefficient. Thus, in the present invention, it may be possible to estimate a rotational speed of the motor in accordance with a configuration diagram of the motor system and power receiver model in FIG. 2.

After motor rotational speed estimation according to the above-described method, the frequency estimate derivation S200 may be executed, as illustrated in FIG. 1. The frequency estimate derivation may be executed in addition to the rotational speed estimate derivation since the present invention proposes a method for removing hall sensor noise by using a filter, to accomplish the object of the present invention. Since the filter functions to allow particular frequency components to pass therethrough, conversion of a rotational speed estimate into a frequency estimate may also be executed in the present invention, for application of the filter.

Furthermore, conversion of a rotational speed estimate into a frequency estimate may be achieved using the following Expression according to the present invention.

$$f = \omega_e/2\pi$$

wherein, f is a hall sensor frequency estimate, and $\omega_e$ is a motor rotational speed estimate.

Since an equation of frequency according to rotational speed is generally expressed by "$\omega=2\pi \times f$ ($\omega$: rotational angular speed, and f: frequency), the above Expression may be derived through conversion of the equation. Under the condition that a hall sensor frequency estimate has been derived, a filter may be set for detection of noise. For example, a low-pass filter, a high-pass filter, and a band-pass filter may be used. Accordingly, noise may be detected after selection of one of the above-described filters.

In the present invention, a noise detection method, which uses a band-pass selected from among various types of filters, may be used. The band-pass filter, which allows frequencies of a particular frequency band to pass therethrough, is a combination of a low-pass filter and a high-pass filter. Generally, the frequency of a normal signal (e.g., without noise) may have minimal difference from a frequency estimate derived through a speed estimator model or the like. However, the frequency of a signal including noise may have a significant difference from the frequency estimate due to the noise.

In this regard, frequencies of signals near the frequency estimate may correspond to the frequency of a normal signal, and signal frequencies of other frequency bands may correspond to those of signals including noise. In the present invention, the band-pass filter may be used to allow the frequencies near the frequency estimate to pass therethrough. As the band-pass filter, a hardware type filter may be configured using a capacitor and a resistor. In particular, however, there are drawbacks in terms of efficiency and costs. Accordingly, a filter configured in a software manner has recently been proposed to overcome the above-described drawbacks. In this regard, a software filter may be used in the present invention.

When setting the band-pass filter, the frequency band allowed to pass through the filter should be considered. Particularly, when signals including no noise have a constant frequency, the filter may be configured to allow only the frequency to pass therethrough. However, normal signals including minimal noise inevitably have frequency differences of a particular range due to various parameters, for example, friction. Accordingly, a desired bandwidth should be determined, taking into consideration of the above-described frequency differences. The bandwidth corresponds to a value obtained by determining a minimum pass frequency from a maximum pass frequency. Frequencies of the bandwidth are distributed along a frequency axis at opposite sides of a central pass frequency. When the band-pass filter has a narrow bandwidth, the quality factor thereof is high and, as such, the filter performance of the band-pass filter is high. On the other hand, when the band-pass filter has a wide bandwidth, the quality factor thereof is low and, as such, the filter performance of the band-pass filter is low.

To determine a desired bandwidth of the band-pass filter, the present invention proposes a method of deriving a bandwidth by multiplying a motor rotational speed estimate variation by a safety factor. The bandwidth may be derived using the following Expression:

$$B = \alpha \times \Delta\omega_e / \pi$$

wherein, B is a bandwidth, $\alpha$ is a safety factor, and $\Delta\omega_e$ is a motor rotational speed estimate variation.

In other words, a motor rotational speed estimate variation when ±maximum torque (e.g., torques according to q-axis current command values) is generated, may be derived with reference to the motor rotational speed estimate previously derived using the speed estimator model. Thereafter, maximum and minimum pass frequencies of the band-pass filter may be determined based on a variation value obtained by multiplying the derived motor rotational speed estimate variation by the safety factor to prevent frequencies of normal hall sensor signals having differences of a particular range, as described above, from being filtered. Additionally, "$\alpha$" may have various values based on a requirement of the designer and "$\alpha$" is intimately associated with the above-described quality factor.

In other words, when "$\alpha$" is increased, the quality factor is reduced thus causing deterioration of filter performance. However, when "$\alpha$" is excessively low, there is no remarkable enhancement in filter performance. Rather, there may be occasions that frequencies of normal hall sensor signals may be filtered. Therefore, an appropriate value of "$\alpha$" may be set, taking into consideration the above-described matters. When general driving situations of the motor are taken into consideration, "$\alpha$" may be set to about 1.5 to 2. The maximum and minimum pass frequencies derived as described above may be expressed by the following Expressions:

$$f_{min} = (\omega_e - \alpha\Delta\omega_e)/(2\pi), f_{max} = (\omega_e + \alpha\Delta\omega_e)/(2\pi)$$

wherein, $f_{min}$ is a minimum pass frequency, $\omega_e$ is a motor rotational speed estimate, $\alpha$ is a safety factor, $\Delta\omega_e$ is a motor rotational speed estimate variation, and $f_{max}$ is a maximum pass frequency.

Since the bandwidth corresponds to a value obtained by deducting the minimum pass frequency from the maximum pass frequency, the above-described Expression "$B = \alpha \times \Delta\omega_e/\pi$" is derived by deducting "$f_{min}$" from "$f_{max}$" in the above-described Expressions.

Although a desired bandwidth of the band-pass filter may be derived by the above-described method, bandwidth derivation may also be achieved by a method of experimentally deriving a maximum rotational speed variation, deriving a maximum bandwidth, based on the derived maximum rotational speed, and deriving a desired bandwidth, based on the derived maximum bandwidth, or a method using map data capable of deriving bandwidths corresponding to different motor rotational speeds (or different hall sensor frequencies). In connection with this, the present invention proposes a method for deriving a desired bandwidth of a band-pass filter, using map data that provides a bandwidth as an output based on a motor rotational speed estimate as an input. Particularly, the map data may be defined experimentally.

After the bandwidth of the pass band filter is set based on the filter setting S300, frequency comparison S400 may be executed to compare the motor hall sensor frequency derived by the hall sensor disposed at the motor, as illustrated in FIG. 1 with the bandwidth of the filter set in the filter setting S300, to determine whether the derived motor hall sensor frequency is within the bandwidth. When the frequency of each hall sensor signal in the motor is varied due to a variation in rotational speed of the motor, the frequency derived by the hall sensor indicates the varied hall sensor signal frequency.

The signal sensed by the hall sensor itself does not have a frequency value because the signal is a digital signal. In the present invention, accordingly, the motor hall sensor frequency derived by the hall sensor indicates the frequency of a pulse signal generated based on repetition of signals of "0" or "1" transferred by the hall sensor. When the motor rotates at a substantially constant speed in accordance with synchronization of the stator and rotor thereof, the hall sensor thereof may be configured to periodically generate a substantially constant signal of "0" or "1". In particular, the generated signal has a waveform that corresponds to a waveform of a pulse signal having a particular period and, as such, a particular frequency may be derived.

When the motor hall sensor frequency derived in the above-described manner is varied due to a variation in rotational speed or the like, the varied motor hall sensor frequency may be compared with the bandwidth of the band-pass filter in the frequency comparison S400, to determine whether the varied motor hall sensor frequency is within the set bandwidth, for application of the band-pass filter set in the filter setting S300 to remove noise generated due to the rotational speed variation or the like.

In response to determining through the comparison that the motor hall sensor frequency is not within the bandwidth, the controller may be configured to execute noise detection S450 of detecting the motor hall sensor frequency as noise and motor control S500 of deriving position and speed of the rotor in the motor while excluding the hall sensor frequency detected as noise, and operating the motor, based on the derived position and speed.

The frequency component having the motor hall sensor frequency not included in the bandwidth is a frequency component that includes noise or a frequency component that corresponds to noise. Accordingly, such a frequency component may be detected as noise in the noise detection S450. After detection of the above-described frequency component, motor operation may be executed using a motor hall sensor frequency component determined as a signal having a normal frequency under the condition that the hall sensor frequency signal detected as noise is excluded. Although motor control may be achieved using various methods, speed feedback control may be generally used.

In response to determining through the comparison that the motor hall sensor frequency is within the bandwidth, the controller may be configured to execute motor control S500 by deriving position and speed of the rotor in the motor using the motor hall sensor frequency, to operate the motor, since the motor hall sensor frequency is a normal frequency. Motor operation in the motor control S500 may be executed using general speed feedback control, as described above.

As apparent from the above description, in accordance with the present invention, a noise signal generated from the motor hall sensor may be detected and, as such, motor control may be executed using a normal signal under the condition that the detected noise signal is excluded. Accordingly, it may be possible to achieve more stable motor control. In addition, it may be possible to eliminate instability of speed control caused by speed measurement errors caused by a hall sensor noise signal in accordance with the speed estimator model of the present invention. Since the present invention may be implemented through application of a software filter, there may be no cost increase in implementing the present invention.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a motor, comprising:
   deriving, by a controller, a motor rotational speed estimate using a speed estimator model;
   deriving, by the controller, a motor hall sensor frequency estimate based on the derived rotational speed estimate;
   setting, by the controller, a bandwidth of a filter for noise detection based on the derived hall sensor frequency estimate and the derived rotational speed estimate, wherein the bandwidth is set to allow the frequency estimate derived in the motor hall sensor frequency estimate derivation to pass therethrough;
   comparing, by the controller, the motor hall sensor frequency derived by the hall sensor disposed at the motor with the bandwidth of the set filter, to determine whether the derived motor hall sensor frequency is within the bandwidth;
   deriving, by the controller, the position of the rotor and the speed of the rotor using the motor hall sensor frequency derived by the hall sensor disposed at the motor when the derived motor hall sensor frequency is within the bandwidth of the filter, and operating the motor based on the derived position and speed;
   detecting, by the controller, the motor hall sensor frequency as noise when the derived motor hall sensor frequency is beyond the bandwidth; and
   deriving, by the controller a position of the rotor in the motor and a speed of the rotor while excluding the hall sensor frequency detected as noise and operating the motor based on the derived position and speed.

2. The method according to claim 1, wherein the motor rotational speed estimate derivation includes deriving, by the controller, the motor rotational speed estimate using a q-axis voltage equation as to a motor rotating magnetic field.

3. The method according to claim 2, wherein the q-axis voltage equation satisfies the following Expression:

$$V_q = R_s \times I_q - L_q \times (dI_q/dt) + \omega_e \times L_d \times I_d + \omega_e \times \Psi_f$$

wherein, $V_q$ is a q-axis voltage of a rotating magnetic field, $R_s$ is an armature coil resistance, $I_q$ is a q-axis current of the rotating magnetic field, $L_q$ is a q-axis inductance of the rotating magnetic field, $\omega_e$ is the motor rotational speed estimate, $I_d$ is a d-axis current of the rotating magnetic field, and $\Psi_f$ is an armature magnetic flux linkage generated by permanent magnets.

4. The method according to claim 1, wherein the motor rotational speed estimate derivation includes deriving, by the controller, the motor rotational speed estimate using an equation based on a relationship between torque and load in the motor.

5. The method according to claim 4, wherein the equation based on the relationship between torque and load in the motor satisfies the following Expression:

$$T_q = J \times \theta'' + B \times \omega_e + K \times \omega_e^2$$

wherein, $T_q$ is a rotational torque of the motor, J is a rotational inertial momentum of the motor, $\theta''$ is a rotational acceleration of the motor, B is a rotational frictional coefficient of the motor, $\omega_e$ is the motor rotational speed estimate, and K is a line resistance coefficient.

6. The method according to claim 1, wherein the motor hall sensor frequency estimate derivation includes deriving, by the controller, the motor hall sensor frequency estimate using the following Expression:

$$f = \omega_e / 2\pi$$

wherein, f is the hall sensor frequency estimate, and $\omega_e$ is the motor rotational speed estimate.

7. The method according to claim 1, wherein the filter has the bandwidth derived by multiplying a motor rotational speed estimate variation by a safety factor.

8. The method according to claim 1, wherein the filter has the bandwidth derived using the following Expression:

$$B = \alpha \times \Delta\omega_e / \pi$$

wherein, B is the bandwidth, $\alpha$ is a safety factor, and $\Delta\omega_e$ is a motor rotational speed estimate variation.

9. The method according to claim 1, wherein the filter has the bandwidth derived using map data to provide the bandwidth as an output based on the motor rotational speed estimate as an input.

* * * * *